US012612037B2

(12) United States Patent
Antony

(10) Patent No.: US 12,612,037 B2
(45) Date of Patent: Apr. 28, 2026

(54) COLLISION PREDICTION BASED ON DIFFERENT TYPES OF IMPACT

(71) Applicant: Allstate Insurance Company, Northbrook, IL (US)

(72) Inventor: Lucas Antony, Chicago, IL (US)

(73) Assignee: Allstate Insurance Company, Northbrook, IL (US)

( * ) Notice: Subject to any disclaimer, the term of this patent is extended or adjusted under 35 U.S.C. 154(b) by 233 days.

(21) Appl. No.: 18/216,001

(22) Filed: Jun. 29, 2023

(65) Prior Publication Data

US 2025/0002011 A1 Jan. 2, 2025

(51) Int. Cl.
*B60W 30/095* (2012.01)
*G01P 15/00* (2006.01)
*G01S 19/52* (2010.01)

(52) U.S. Cl.
CPC ......... *B60W 30/0953* (2013.01); *G01P 15/00* (2013.01); *G01S 19/52* (2013.01)

(58) Field of Classification Search
CPC .... B60W 30/0953; G01P 15/00; G01S 19/52; B60R 21/013; G06N 3/044; G06N 3/045; G06N 3/08; G08G 1/0133; G08G 1/0112
See application file for complete search history.

(56) References Cited

U.S. PATENT DOCUMENTS

| | | | |
|---|---|---|---|
| 9,547,754 B1 | 1/2017 | Krüger et al. | |
| 10,997,800 B1 * | 5/2021 | Salodkar | G07C 5/0808 |

| | | | |
|---|---|---|---|
| 2002/0118931 A1 | 8/2002 | Ohbayashi et al. | |
| 2016/0171864 A1 | 6/2016 | Ciaramelletti | |
| 2017/0221283 A1 | 8/2017 | Pal et al. | |
| 2020/0339113 A1 | 10/2020 | Stobbe et al. | |
| 2020/0377048 A1 * | 12/2020 | Umezawa | B60R 21/38 |
| 2021/0031762 A1 * | 2/2021 | Matsunaga | B60W 50/14 |
| 2021/0046947 A1 * | 2/2021 | Jung | B60W 30/0953 |
| 2021/0225094 A1 | 7/2021 | Salodkar et al. | |
| 2021/0407219 A1 | 12/2021 | Tammali et al. | |
| 2022/0118931 A1 * | 4/2022 | Qi | B60R 21/01338 |
| 2022/0246036 A1 | 8/2022 | Petersen et al. | |

OTHER PUBLICATIONS

International Search Report and Written Opinion, PCT/US2024/035865, Oct. 14, 2024.
Kumar et al., An IOT-Based Vehicle Accident Detection and Classification System Using Sensor Fusion, IEEE vol. 8, No. 2, pp. 869-880, Jul. 13, 2020.

* cited by examiner

*Primary Examiner* — Dhaval V Patel

(57) ABSTRACT

Implementations claimed and described herein provide systems and methods for generating a prediction for a likelihood of a collision based on a respective collision prediction algorithm for a particular type of impact. In one implementation, determining, by a collision prediction algorithm, a prediction score based on a subset of variables associated with the movement of a mobile device. The prediction score associated with a likelihood that the movement is associated with a particular type of impact associated with the first collision prediction algorithm. A prediction that the movement is not association with the first type of impact when the prediction score is below a threshold score is outputted.

16 Claims, 6 Drawing Sheets

400

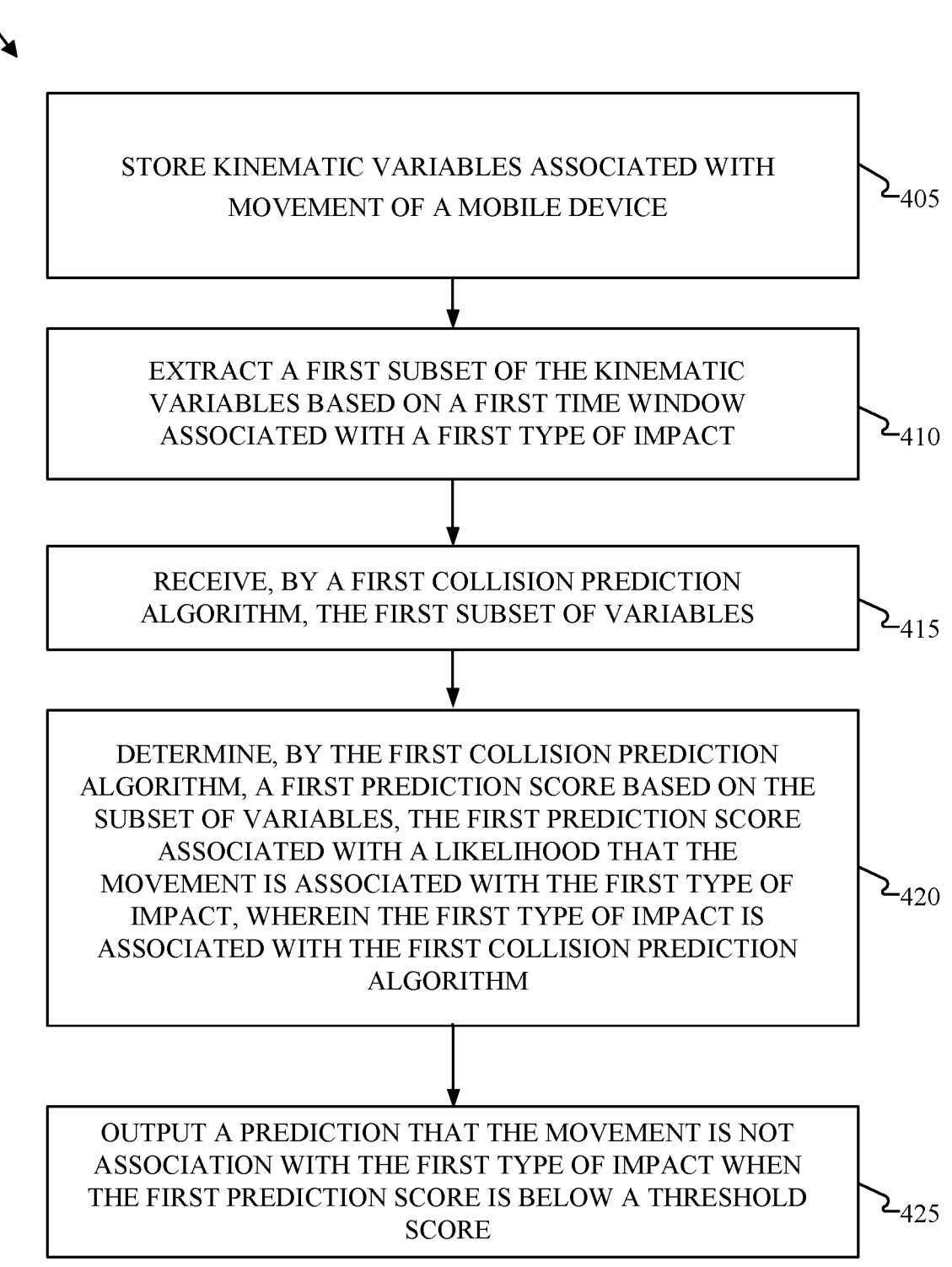

STORE KINEMATIC VARIABLES ASSOCIATED WITH MOVEMENT OF A MOBILE DEVICE ⌐405

EXTRACT A FIRST SUBSET OF THE KINEMATIC VARIABLES BASED ON A FIRST TIME WINDOW ASSOCIATED WITH A FIRST TYPE OF IMPACT ⌐410

RECEIVE, BY A FIRST COLLISION PREDICTION ALGORITHM, THE FIRST SUBSET OF VARIABLES ⌐415

DETERMINE, BY THE FIRST COLLISION PREDICTION ALGORITHM, A FIRST PREDICTION SCORE BASED ON THE SUBSET OF VARIABLES, THE FIRST PREDICTION SCORE ASSOCIATED WITH A LIKELIHOOD THAT THE MOVEMENT IS ASSOCIATED WITH THE FIRST TYPE OF IMPACT, WHEREIN THE FIRST TYPE OF IMPACT IS ASSOCIATED WITH THE FIRST COLLISION PREDICTION ALGORITHM ⌐420

OUTPUT A PREDICTION THAT THE MOVEMENT IS NOT ASSOCIATION WITH THE FIRST TYPE OF IMPACT WHEN THE FIRST PREDICTION SCORE IS BELOW A THRESHOLD SCORE ⌐425

FIG. 4

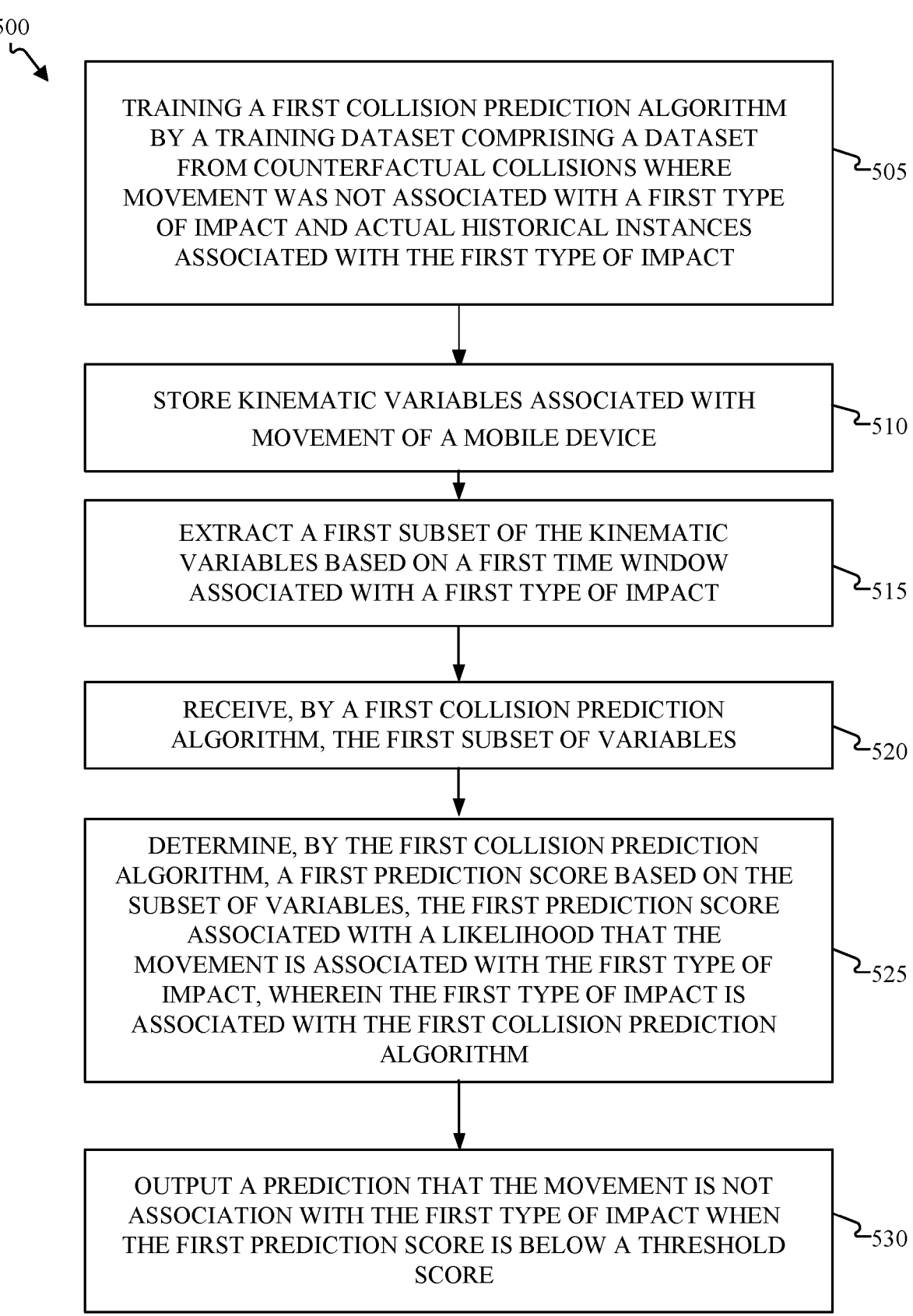

500

TRAINING A FIRST COLLISION PREDICTION ALGORITHM BY A TRAINING DATASET COMPRISING A DATASET FROM COUNTERFACTUAL COLLISIONS WHERE MOVEMENT WAS NOT ASSOCIATED WITH A FIRST TYPE OF IMPACT AND ACTUAL HISTORICAL INSTANCES ASSOCIATED WITH THE FIRST TYPE OF IMPACT ~505

STORE KINEMATIC VARIABLES ASSOCIATED WITH MOVEMENT OF A MOBILE DEVICE ~510

EXTRACT A FIRST SUBSET OF THE KINEMATIC VARIABLES BASED ON A FIRST TIME WINDOW ASSOCIATED WITH A FIRST TYPE OF IMPACT ~515

RECEIVE, BY A FIRST COLLISION PREDICTION ALGORITHM, THE FIRST SUBSET OF VARIABLES ~520

DETERMINE, BY THE FIRST COLLISION PREDICTION ALGORITHM, A FIRST PREDICTION SCORE BASED ON THE SUBSET OF VARIABLES, THE FIRST PREDICTION SCORE ASSOCIATED WITH A LIKELIHOOD THAT THE MOVEMENT IS ASSOCIATED WITH THE FIRST TYPE OF IMPACT, WHEREIN THE FIRST TYPE OF IMPACT IS ASSOCIATED WITH THE FIRST COLLISION PREDICTION ALGORITHM ~525

OUTPUT A PREDICTION THAT THE MOVEMENT IS NOT ASSOCIATION WITH THE FIRST TYPE OF IMPACT WHEN THE FIRST PREDICTION SCORE IS BELOW A THRESHOLD SCORE ~530

COLLISION PREDICTION BASED ON DIFFERENT TYPES OF IMPACT

FIELD

Aspects of the presently disclosed technology relate generally to predicting collisions and more particularly to collision prediction that distinguishes between different types of impact.

BACKGROUND

Collision detection involves determining whether there has been an intersection of two or more objects. There are different ways of determining a set of trigger parameters that would be used for predicting whether or not a vehicular collision has occurred. However, even sophisticated collision detection systems may result in false positives, since there are different types of movement that are similar to collisions when measuring impact. However, such movements may not necessarily be a vehicular collision. With these observations in mind, among others, various aspects of the present disclosure were conceived and developed.

SUMMARY

Implementations described and claimed herein address the foregoing by providing systems and methods for generating a prediction for a likelihood of a collision based on a respective collision prediction algorithm for a particular type of impact. In some implementations, kinematic variables associated with movement of a mobile device may be stored. A first subset of the kinematic variables based on a first time window associated with a first type of impact may be extracted. By a first collision prediction algorithm, the first subset of variables may be received. By the first collision prediction algorithm, a first prediction score based on the first subset of variables may be determined. The first prediction score associated with a likelihood that the movement may be associated with the first type of impact. The first type of impact may be associated with the first collision prediction algorithm. A prediction that the movement is not association with the first type of impact when the first prediction score is below a threshold score may be outputted.

In some implementations, a first collision prediction algorithm may be trained by a dataset from counterfactual collisions where movement was not associated with a first type of impact and actual historical instances associated with the first type of impact. Kinematic variables associated with the movement of a mobile device may be stored. A first subset of the kinematic variables may be extracted based on a first time window associated with the first type of impact. By the first collision prediction algorithm, the first subset of variables may be received, and a first prediction score may be determined based on the first subset of variable. The first prediction score may be associated with a likelihood that the movement is associated with the first type of impact. The first type of impact may be associated with the first collision prediction algorithm. A prediction that the movement is not association with the first type of impact when the first prediction score is below a threshold score may be outputted.

In some implementations, global positioning system (GPS) speed variables, GPS altitude variables, and accelerometer magnitude variables associated with movement of a mobile device may be stored. A first subset of the global positioning system (GPS) speed variables, the GPS altitude variables, and the accelerometer magnitude variables based on a first time window associated with a first type of impact may be extracted. By a first collision prediction algorithm, the first subset of variables may be extracted. By the first collision prediction algorithm, a first prediction score based on the first subset of variables may be determined. The first prediction score associated with a likelihood that the movement is associated with the first type of impact. The first type of impact is associated with the first collision prediction algorithm. A prediction that the movement is not association with the first type of impact when the first prediction score is below a threshold score may be outputted.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed descriptions are to be regarded as illustrative in nature and not limiting.

BRIEF DESCRIPTION OF THE DRAWINGS

FIG. 4 illustrates example operations for generating a prediction for a likelihood of a collision based on a respective collision prediction algorithm for a particular type of impact.

FIG. 5 illustrates example operations for training the prediction model for generating a prediction for a likelihood of a collision based on training data for generating a prediction for a likelihood of a collision based on a respective collision.

DETAILED DESCRIPTION

Figure 1:
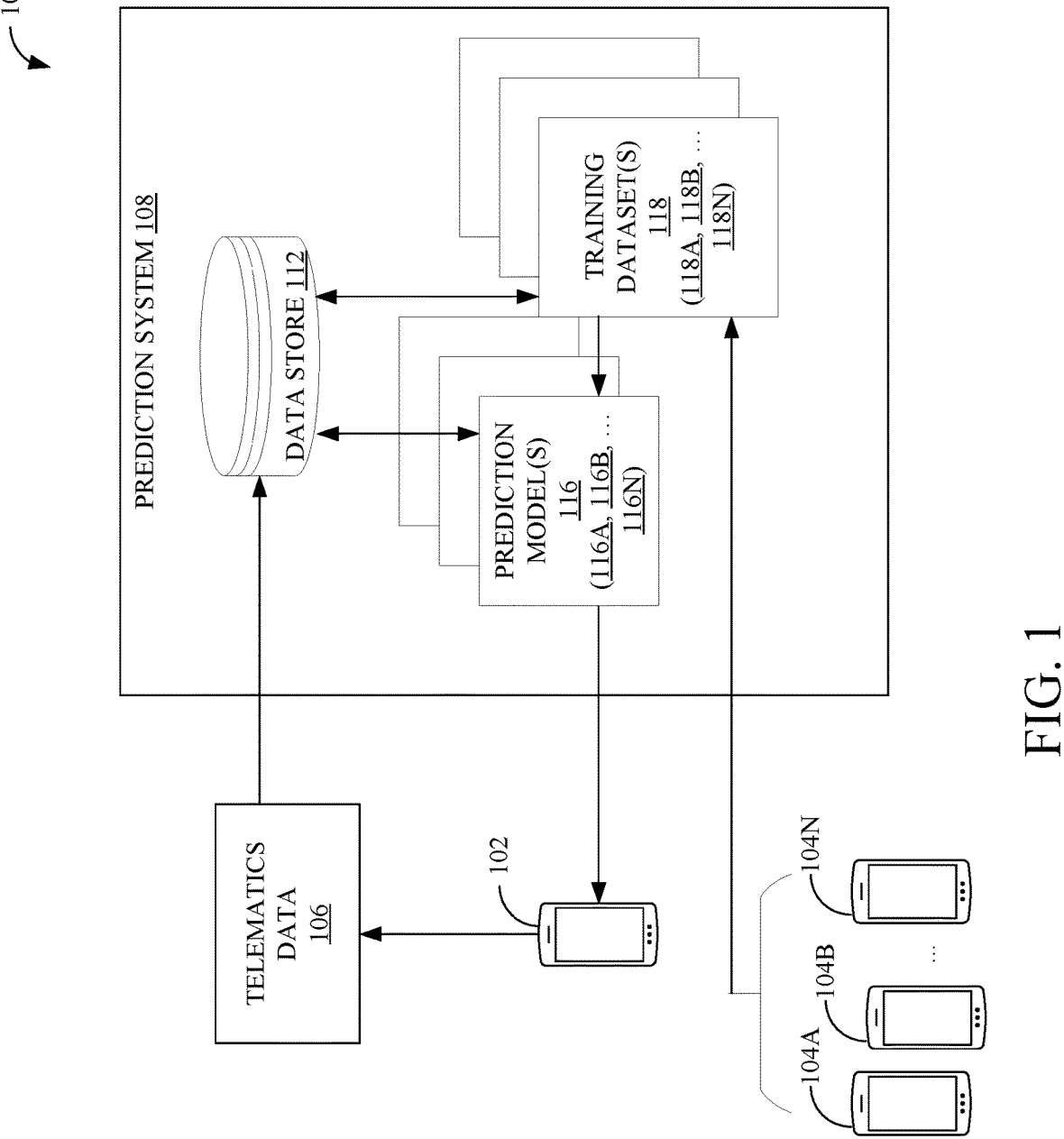
FIG. 1 illustrates an example diagram showing a prediction system for generating a prediction for a likelihood of a collision based on a respective collision prediction algorithm for a particular type of impact.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form to avoid obscuring the concepts of the subject matter of this disclosure.

Disclosed are systems, apparatuses, methods, non-transitory computer-readable media, and circuits for generating a prediction for a likelihood of a collision based on a respective collision prediction algorithm for a particular type of impact. According to at least one example, a system comprising one or more processors, a display with a user interface, and a memory unit storing computer-executable instructions, which when executed by the one or more processors, cause the system to store kinematic variables associated with movement of a mobile device. The one or more processors is further caused to extract a first subset of the kinematic variables based on a first time window associated with a first type of impact. By a first collision prediction algorithm, the first subset of variables is received. By the first collision prediction algorithm, a first prediction score based on the first subset of variables is determined, The first prediction score associated with a likelihood that the movement is associated with the first type of impact. The first type of impact is associated with the first collision prediction algorithm. A prediction that the movement is not association with the first type of impact when the first prediction score is below a threshold score is outputted.

According to at least one example, a computer-implemented method is comprising training a first collision prediction algorithm by with a training dataset comprising a dataset from counterfactual collisions where movement was not associated with a first type of impact and actual historical instances associated with the first type of impact. In other words, dataset are created to train on or model parameters are fit to optimize upon the training datasets. According to at least one example, the computer-implemented method comprises storing kinematic variables associated with the movement of a mobile device. A first subset of the kinematic variables based on a first time window associated with the first type of impact may be extracted. By the first collision prediction algorithm, the first subset of variables may be received. According to at least one example, the computer-implemented method may further comprise determining, by the first collision prediction algorithm, a first prediction score based on the first subset of variables, the first prediction score associated with a likelihood that the movement is associated with the first type of impact, wherein the first type of impact is associated with the first collision prediction algorithm. A prediction that the movement is not association with the first type of impact when the first prediction score is below a threshold score may be outputted.

To begin a detailed description of an example diagram 100 showing a prediction system for generating a prediction for a likelihood of a collision based on a respective collision prediction algorithm for a particular type of impact is made to FIG. 1. A device 102, such as a mobile device or some other form of telematics device, may collect telematics data 106. Telematics data 106 may be collected from a global position system (GPS), micro-electro-mechanical system (MEMS) sensors, and other data logging tools. The telematics data 106 captured can include location, speed, idling time, harsh acceleration or braking, vehicle faults, and more.

The telematics data 106 may be sent to a prediction system 108 to ultimately outputting a prediction that the movement is not association with the first type of impact when the first prediction score is below a threshold score. The prediction system 108 may comprise a remote processor, partially comprise the remote processor and use one or more processors on the device 102, or fully determine the prediction on one or more processors on the device 102. If the prediction system 108 is remote, data sent to and from a mobile application may be via an application programming interface (API).

The telematics data 106, which may include at least one of global positioning system (GPS) speed variables, GPS altitude variables, and accelerometer magnitude variables, may be stored at a data store 112 or at the device 102. In some cases, the kinematic variables may be convolutional neural network (CNN) model and the first collision prediction algorithm is a collision prediction CNN. A prediction model 116A (of a plurality of different prediction models 116A, 116B, 116N) may receive the telematics data 106 from the data store or may directly receive the telematics data 106. The prediction model 116A may extract a first subset of the kinematic variables based on a first time window associated with a first type of impact. The prediction model 116 may receive, by a first collision prediction algorithm, the first subset of variables. The prediction model 116A may determine, by the first collision prediction algorithm, a first prediction score based on the first subset of variables, the first prediction score associated with a likelihood that the movement is associated with the first type of impact.

The first type of impact may be associated with the first collision prediction algorithm. Consequently, the prediction model 116A may output a prediction that the movement is not association with the first type of impact when the first prediction score is below a threshold score. As such, the prediction model 116A may be trained by a respective training datasets 118A (of a plurality of different respective training datasets 118A, 118B, . . . 118N). The prediction model may be trained by a first collision prediction algorithm and may receive a dataset from counterfactual collisions from the data store 112. The dataset may be collected data from other devices 104A, 104B, . . . 104N. The counterfactual collisions may include movement that was not associated with a first type of impact and actual historical instances associated with the first type of impact.

In some cases, a second subset of the kinematic variables based on a second time window associated with a second type of impact is extracted. A second prediction model 116B may receive, by a second collision prediction algorithm, the second subset of variables. The second prediction model 116B may determine, by the second collision prediction algorithm, a second prediction score associated with a likelihood that the movement is associated with the second type of impact associated with the second collision prediction algorithm based on the second subset of variables. The second prediction model 116B may output a prediction that the movement is association with the second type of impact when the second prediction score is at or above the threshold score. In some cases, the first type of impact is selected from a group of at least: an amusement park ride impact, a skiing-based impact, a boat- or water-based impact, or an action sports type impact, and the second collision prediction algorithm is trained with true automobile collisions.

Figure 2:
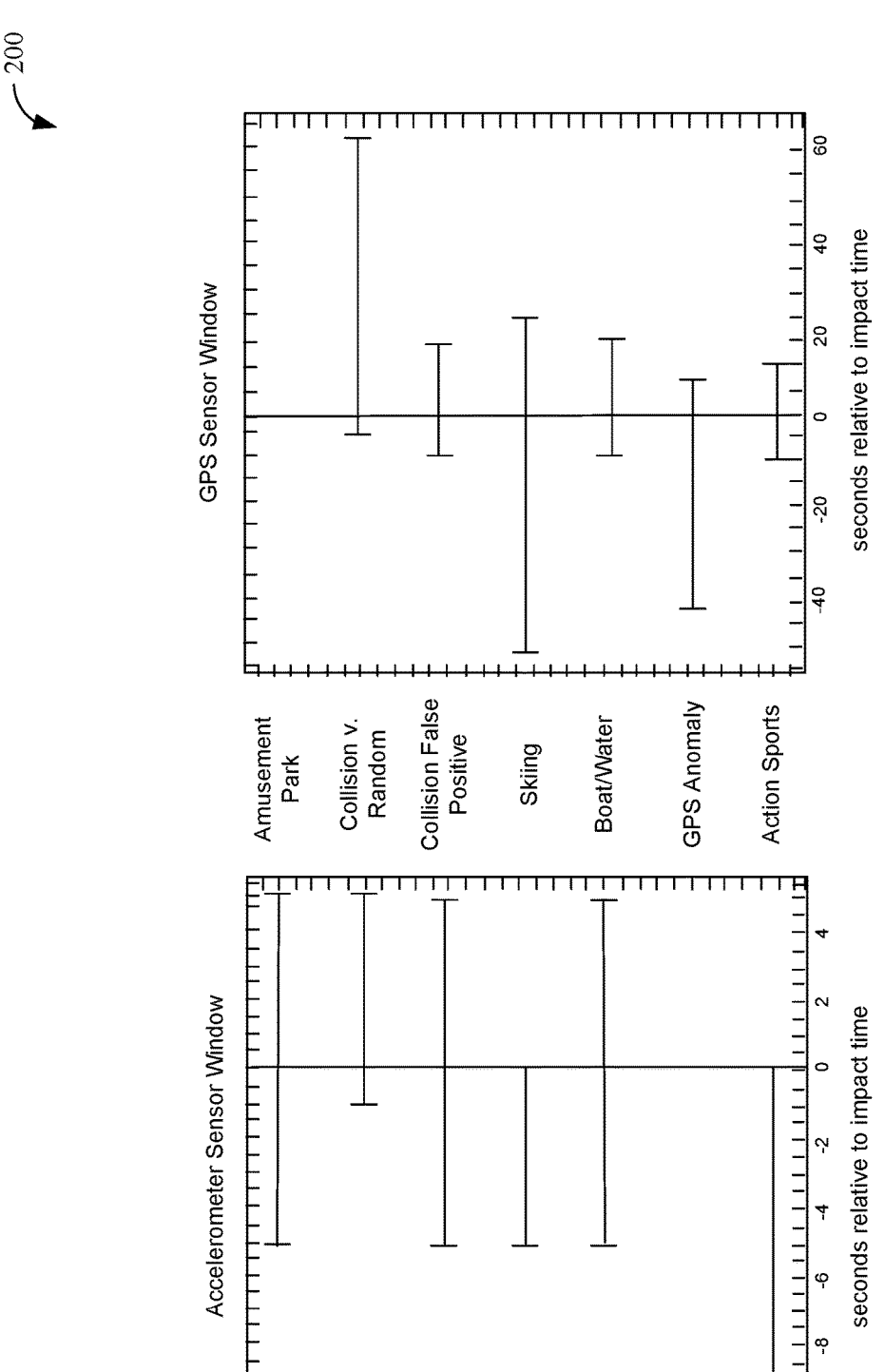
FIG. 2 illustrates example graphs with various accelerometer and GPS sensor reading averages associated with various types of impact.

Turning to FIG. 2, the illustrated example diagram shows example windows of various accelerometer and GPS sensor reading averages associated with various types of impact. Different types of collisions have different time windows and different sensor inputs to consider for determining a prediction for whether inputted telematics data is associated with a specific type of impact.

For determining whether a collision has occurred, by comparing to random movement, for example, a time window of −1 seconds to 5 seconds, relative to impact time, for an input from an accelerometer sensor and a time window of −5 seconds to 60 seconds, relative to impact time, for an input from a GPS speed sensor is used. For false positive collisions, for example, a time window of −5 seconds to 5 seconds, relative to impact time, for an input from an accelerometer sensor and a time window of −10 seconds to 20 seconds, relative to impact time, for an input from a GPS speed sensor and GPS altitude is used.

For skiing collisions, for example, a time window of −5 seconds to 0 seconds, relative to impact time, for an input from an accelerometer sensor and a time window of −50 seconds to 25 seconds, relative to impact time, for an input from a GPS speed sensor and GPS altitude is used. For example, for movement at amusement parks, such as on rollercoasters, a time window of −5 seconds to 5 seconds, relative to impact time, for an input from an accelerometer sensor is used. Furthermore, amusement parks and ski resorts may be geo-filtered or filtered based on distance to a amusement park or ski resort. For boating/water collisions, for example, a time window of −5 seconds to 5 seconds, relative to impact time, for an input from an accelerometer sensor and a time window of −10 seconds to 20 seconds, relative to impact time, for an input from a GPS speed sensor and GPS altitude is used.

For GPS anomaly collisions, for example, no input from the accelerometer sensor and a time window of −40 seconds to 10 seconds, relative to impact time, for an input from a GPS speed sensor, a GPS latitude and longitude sensor, and a GPS accuracy sensor is used. And, for action sports, for example, a time window of −10 seconds to 0 seconds, relative to impact time, for an input from an accelerometer sensor and a time window of −10 seconds to 10 seconds, relative to impact time, for an input from a GPS speed sensor and GPS altitude is used.

These are just a few of a plurality of different types of collisions that may need to be distinguished from vehicular collisions. When the telematics data indicate that there is a high impact event that has deceleration around the impact, and sometimes the movement reaching to a stop post-impact, false positives, involving some of the example collisions listed above, need to be filtered out. Furthermore, there may be a filter applied on a distance traveled after the impact.

Figure 3:
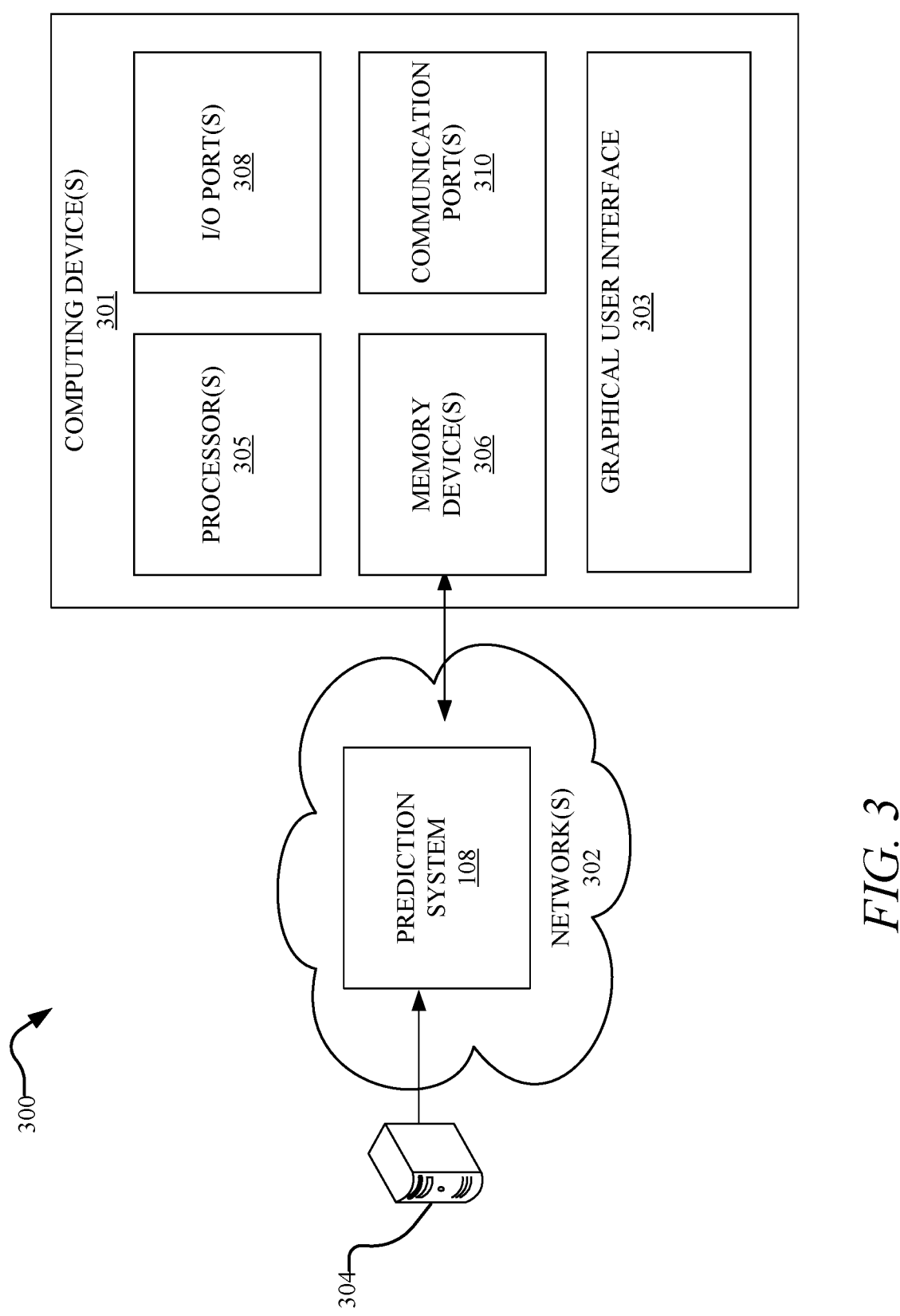
FIG. 3 illustrates an example network environment with one or more computing devices for generating a prediction for a likelihood of a collision based on a respective collision prediction algorithm for a particular type of impact.

FIG. 3 illustrates an example network environment with one or more computing devices for generating a prediction for a likelihood of a collision based on a respective collision prediction algorithm for a particular type of impact. The example network environment 300 includes the one or more network(s) 302 which can be a cellular network such as a 3rd Generation Partnership Project (3GPP) network, a third generation (3G) network, a fourth generation (4G) network, a fifth generation (5G) network, a Long-Term Evolution (LTE), an LTE Advanced Network, a Global System for Mobile Communications (GSM) network, a Universal Mobile Telecommunications System (UMTS) network, and the like. Moreover, the network(s) 302 can include any type of network, such as the Internet, an intranet, a Virtual Private Network (VPN), a Voice over Internet Protocol (VOIP) network, a wireless network (e.g., Bluetooth), a cellular network, a satellite network, combinations thereof, etc.

In some cases, the device 102 runs software and/or a software development kit (SDK) that generate a prediction for a likelihood of a collision based on a respective collision prediction algorithm for a particular type of impact. In some cases, the models and associated logic may be accessed remotely via the cloud and applied on the device 102. A local model may reside on the device 102 in the case the device 102 is offline.

The network(s) 302 provide access to and interactions with systems to generate a prediction for a likelihood of a collision based on a respective collision prediction algorithm for a particular type of impact. The network(s) 302 can include communications network components such as, but not limited to gateways routers, servers, and registrars, which enable communication across the network(s) 302. In one implementation, the communications network components include multiple ingress/egress routers, which may have one or more ports, in communication with the network (s) 302. Communication via any of the networks can be wired, wireless, or any combination thereof.

The network environment 300 may also include at least one server device 304 hosting software, application(s), web-sites, and the like for operating the prediction system 108 for generating a prediction for a likelihood of a collision based on a respective collision prediction algorithm for a particular type of impact. The prediction system 108 can receive inputs from various computing devices and transform the received input data into other unique types of data. The server(s) 304 may be a single server, a plurality of servers with each such server being a physical server or a virtual machine, or a collection of both physical servers and virtual machines.

In another implementation, a cloud hosts one or more components of the systems 100-300. The server(s) 304 may represent an instance among large instances of application servers in a cloud computing environment, a data center, or other computing environment. The server(s) 304 can access data stored at one or more database(s) (e.g., including any of the values or identifiers discussed herein). The systems 100-300, the server(s) 304, and/or other resources connected to the network(s) 302 may access one or more other servers to access other websites, applications, web services inter-faces, GUIs, storage devices, APIs, computing devices, or the like to perform the techniques discussed herein. The server(s) can include one or more computing device(s) 301, as discussed in greater detail below.

For instance, the network environment 300 can include the one or more computing device(s) 301 for executing the prediction system 108 and/or generating a prediction for a likelihood of a collision based on a respective collision prediction algorithm for a particular type of impact. In one implementation, the one or more computing device(s) 301 include the one or more server device(s) 304 executing the prediction system 108 as a software application and/or a module or algorithmic component of software.

In some instances, the computing device(s) 301 can include a computer, a personal computer, a desktop com-puter, a laptop computer, a terminal, a workstation, a server device, a cellular or mobile phone, a mobile device, a smart mobile device a tablet, a wearable device (e.g., a smart watch, smart glasses, a smart epidermal device, etc.) a multimedia console, a television, an Internet-of-Things (IoT) device, a smart home device, a medical device, a virtual reality (VR) or augmented reality (AR) device, a vehicle (e.g., a smart bicycle, an automobile computer, etc.), and/or the like. The computing device(s) 301 may be inte-grated with, form a part of, or otherwise be associated with the systems/network environments 100-300. It will be appreciated that specific implementations of these devices may be of differing possible specific computing architec-tures not all of which are specifically discussed herein but will be understood by those of ordinary skill in the art.

The computing device 301 may be a computing system capable of executing a computer program product to execute a computer process. Data and program files may be input to the computing device 301, which reads the files and executes the programs therein. Some of the elements of the computing device 301 include one or more hardware processors 305, one or more memory devices 306, and/or one or more ports, such as input/output (IO) port(s) 308 and communication port(s) 310. Additionally, other elements that will be recognized by those skilled in the art may be included in the computing device 301 but are not explicitly depicted in FIG. 1 or discussed further herein. Various elements of the computing device 301 may communicate with one another by way of the communication port(s) 310 and/or one or more communication buses, point-to-point communication paths, or other communication means.

The processor 305 may include, for example, a central processing unit (CPU), a microprocessor, a microcontroller, a digital signal processor (DSP), and/or one or more internal levels of cache. There may be one or more processors 305, such that the processor 305 comprises a single central-processing unit, or a plurality of processing units capable of executing instructions and performing operations in parallel with each other, commonly referred to as a parallel processing environment.

The computing device 301 may be a conventional computer, a distributed computer, or any other type of computer, such as one or more external computers made available via a cloud computing architecture. The presently described technology is optionally implemented in software stored on the data storage device(s) such as the memory device(s) 306, and/or communicated via one or more of the I/O port(s) 308 and the communication port(s) 310, thereby transforming the computing device 301 in FIG. 3 to a special purpose machine for implementing the operations described herein and generating a prediction for a likelihood of a collision based on a respective collision prediction algorithm for a particular type of impact. Moreover, the computing device 301, as implemented in the systems 100-300, receives various types of input data (e.g., in different data formats) and transforms the input data through the stages of the data flow described herein into new types of data files (e.g., predictions for a likelihood of a collision). Moreover, these new data files are transformed to enable the computing device 301 to do something it could not do before—generate the trip overview 200 in the GUI 303.

The one or more memory device(s) 306 may include any non-volatile data storage device capable of storing data generated or employed within the computing device 301, such as computer executable instructions for performing a computer process, which may include instructions of both application programs and an operating system (OS) that manages the various components of the computing device 301. The memory device(s) 306 may include, without limitation, magnetic disk drives, optical disk drives, solid state drives (SSDs), flash drives, and the like. The memory device(s) 306 may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory device(s) 306 may include volatile memory (e.g., dynamic random-access memory (DRAM), static random-access memory (SRAM), etc.) and/or non-volatile memory (e.g., read-only memory (ROM), flash memory, etc.).

Computer program products containing mechanisms to effectuate the systems and methods in accordance with the presently described technology may reside in the memory device(s) 306 which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

In some implementations, the computing device 301 includes one or more ports, such as the I/O port(s) 308 and the communication port(s) 310, for communicating with other computing or network devices. It will be appreciated that the I/O port 308 and the communication port 310 may be combined or separate and that more or fewer ports may be included in the computing device 301.

The I/O port 308 may be connected to an I/O device, or other device, by which information is input to or output from the computing device 301. Such I/O devices may include, without limitation, one or more input devices, output devices, and/or environment transducer devices.

In one implementation, the input devices convert a human-generated signal, such as, human voice, physical movement, physical touch or pressure, and/or the like, into electrical signals as input data into the computing device 301 via the I/O port 308. Similarly, the output devices may convert electrical signals received from the computing device 301 via the I/O port 308 into signals that may be sensed as output by a human, such as sound, light, and/or touch. The input device may be an alphanumeric input device, including alphanumeric and other keys for communicating information and/or command selections to the processor 305 via the I/O port 308. The input device may be another type of user input device including, but not limited to: direction and selection control devices, such as a mouse, a trackball, cursor direction keys, a joystick, and/or a wheel; one or more sensors, such as a camera, a microphone, a positional sensor, an orientation sensor, an inertial sensor, and/or an accelerometer; and/or a touch-sensitive display screen ("touchscreen"). The output devices may include, without limitation, a display, a touchscreen, a speaker, a tactile and/or haptic output device, and/or the like. In some implementations, the input device and the output device may be the same device, for example, in the case of a touchscreen.

In one implementation, the communication port 310 is connected to the network 302 so the computing device 301 can receive network data useful in executing the methods and systems set out herein as well as transmitting information and network configuration changes determined thereby. Stated differently, the communication port 310 connects the computing device 301 to one or more communication interface devices configured to transmit and/or receive information between the computing device 301 and other devices (e.g., network devices of the network(s) 302) by way of one or more wired or wireless communication networks or connections. Examples of such networks or connections include, without limitation, Universal Serial Bus (USB), Ethernet, Wi-Fi, Bluetooth®, Near Field Communication (NFC), and so on. One or more such communication interface devices may be utilized via the communication port 310 to communicate with one or more other machines, either directly over a point-to-point communication path, over a wide area network (WAN) (e.g., the Internet), over a local area network (LAN), over a cellular network (e.g., third generation (3G), fourth generation (4G), Long-Term Evolution (LTE), fifth generation (5G), etc.) or over another communication means. Further, the communication port 310 may communicate with an antenna or other link for electromagnetic signal transmission and/or reception.

In an example, the prediction system 108 and/or other software, modules, services, and operations discussed herein may be embodied by instructions stored on the memory devices 306 and executed by the processor 305.

The system 300 set forth in FIG. 3 is but one possible example of a computing device 301 or computer system that may be configured in accordance with aspects of the present disclosure. It will be appreciated that other non-transitory tangible computer-readable storage media storing computer-executable instructions for implementing the presently disclosed technology on a computing system may be utilized. In the present disclosure, the methods disclosed may be implemented as sets of instructions or software readable by the computing device 301.

FIG. 4 illustrates example operations for generating a prediction for a likelihood of a collision based on a respective collision prediction algorithm for a particular type of impact, which can be performed by any of the systems 100-300 and/or network environment 300. At operation 405, the method 400 includes storing kinematic variables associated with movement of a mobile device. For example, kinematic variables may include at least one of global positioning system (GPS) speed variables, GPS altitude variables, and accelerometer magnitude variables. At operation 410, the method 400 includes extracting a first subset of the kinematic variables based on a first time window associated with a first type of impact.

At operation 415, the method 400 includes receiving, by a first collision prediction algorithm, the first subset of variables. At operation 420, the method 400 includes determining, by the first collision prediction algorithm, a first prediction score based on the first subset of variables. In some cases, the first prediction score associated with a likelihood that the movement is associated with the first type of impact. In some cases, the first type of impact is associated with the first collision prediction algorithm At operation 425, the method 400 includes output a prediction that the movement is not association with the first type of impact when the first prediction score is below a threshold score.

In some cases, the kinematic variables may be converted into features that represent GPS speed and altitude properties and accelerometer magnitude properties associated with the movement of the mobile device. The first prediction score may be determined based on the features. For feature creation, features may be windowed by grabbing the closest data point to an ideal time point, applying normalization transformations, and encoding GPS anomaly features for gaps. Raw sensor data with corresponding timestamps and event time may be converted into data that can be handled by the respective collision prediction algorithm. For example, there may be settings for maximum time gaps in the sensor data, average time gaps, and checks that GPS points are near the event time and before and after.

In some case, the kinematic variables are convolutional neural network (CNN) model and the first collision prediction algorithm is a collision prediction CNN. Consequently, the collision prediction CNN may be trained to learn which features contribute most to predicting whether the movement is associated with the first type of impact. An example of the collision prediction CNN is described in detail in FIG. 6.

In some cases, the global positioning system (GPS) speed variables and the GPS altitude variables may be associated with a particular GPS sensor window of seconds relative to impact time and the accelerometer magnitude variables are associated with a particular accelerometer sensor window of seconds relative to impact time. The particular GPS sensor window and the particular accelerometer sensor window may be associated with the type of impact.

In some cases, a second subset of the kinematic variables is extracted based on a second time window associated with a second type of impact. By a second collision prediction algorithm, the second subset of variables may be received. By the second collision prediction algorithm, a second prediction score associated with a likelihood that the movement is associated with the second type of impact associated with the second collision prediction algorithm based on the second subset of variable may be determined.

A prediction that the movement is association with the second type of impact when the second prediction score is at or above the threshold score may be outputted. For example, a first subset of variables and a second set of variables may be extracted from a set of data associated with data that indicates a collision has occurred. The different algorithms with the different inputs may provide the different outputs for the likelihood that a respective type of impact has occurred. By comparing the two outputs, a determination may be made of what the likelihood the collision is associated with one type of impact versus another.

In some cases, the first type of impact is selected from a group of at least: an amusement park ride impact, a skiing-based impact, a boat- or water-based impact, or an action sports type impact, and the second collision prediction algorithm is trained with true automobile collisions. In some cases, the first prediction score is based on a continuous scale between two numbers, wherein the continuous scale correlates to a continuous likelihood of collision.

In some cases, predictions from a plurality of collision prediction algorithms may be aggregated and a final prediction that the movement is associated with a collision when the second prediction score is at or above the threshold score and when a third prediction score associated with a third collision prediction algorithm trained with false positive data is below an associated threshold score may be outputted. In some cases, the first collision prediction algorithm is trained with a training dataset comprising a dataset from counterfactual collisions where movement was not associated with the type of impact or actual historical instances associated with the type of impact.

FIG. 5 illustrates example operations for training the prediction model for generating a prediction for a likelihood of a collision based on training data for generating a prediction for a likelihood of a collision based on a respective collision, which can be performed by any of the systems 100-300 and/or network environment 300. At operation 505, the method 500 includes training a first collision prediction algorithm with a training dataset comprising a dataset from counterfactual collisions where movement was not associated with a first type of impact and actual historical instances associated with the first type of impact. At operation 510, the method 500 includes storing kinematic variables associated with movement of a mobile device. At operation 515, the method 500 includes extracting a first subset of the kinematic variables based on a first time window associated with a first type of impact.

At operation 520, the method 500 includes receiving, by a first collision prediction algorithm, the first subset of variables. At operation 525, the method 500 includes determining, by the first collision prediction algorithm, a first prediction score based on the first subset of variables. In some cases, the first prediction score associated with a likelihood that the movement is associated with the first type of impact. In some cases, the first type of impact is associated with the first collision prediction algorithm At operation 530, the method 500 includes output a prediction that the movement is not association with the first type of impact when the first prediction score is below a threshold score.

It is to be understood that the specific order or hierarchy of operations in the methods depicted in FIGS. 4-5 and throughout this disclosure are instances of example approaches and can be rearranged while remaining within the disclosed subject matter. For instance, any of the operations depicted in FIGS. 4-5 may be omitted, repeated, performed in parallel, performed in a different order, and/or combined with any other of the operations depicted in FIGS. 4-5 or discussed herein.

Figure 6:
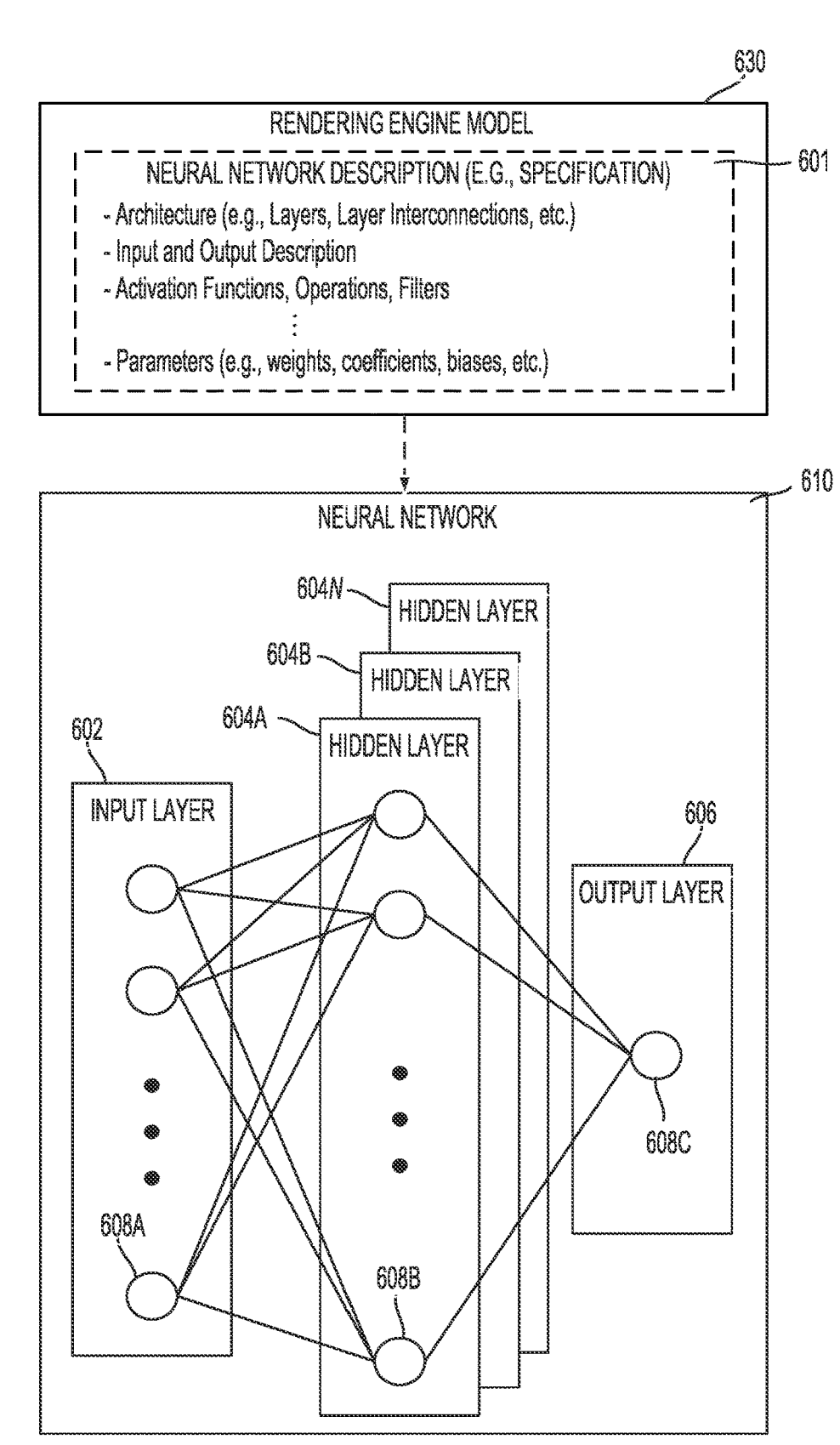
FIG. 6 illustrates an example neural network architecture in accordance with some aspects of the present technology.

FIG. 6 illustrates an example neural network architecture, in accordance with some aspects of the present technology. Architecture 600 includes a neural network 610 defined by an example neural network description 601 in rendering engine model (neural controller) 630. An example of a neural network 610 is the collision prediction CNN. Each neural network 610/collision prediction CNN may associated with a particular type of impact or may have other neural network outputs associated with particular types of impact as the inputs. The neural network 610 can represent a neural network implementation of a rendering engine for rendering media data.

The neural network description 601 can include a full specification of the neural network 610, including the neural network architecture 600. For example, the neural network description 601 can include a description or specification of the architecture 600 of the neural network 610 (e.g., the layers, layer interconnections, number of nodes in each layer, etc.); an input and output description which indicates how the input and output are formed or processed; an indication of the activation functions in the neural network, the operations or filters in the neural network, etc.; neural network parameters such as weights, biases, etc.; and so forth.

The neural network 610 reflects the architecture 600 defined in the neural network description 601. In this example, the neural network 610 includes an input layer 602, which includes input data, such as kinematic variables including at least one of global positioning system (GPS) speed variables, GPS altitude variables, and accelerometer magnitude variables. In one illustrative example, the input layer 602 can include data representing a portion of the input media data such as a patch of data or pixels (e.g., a 128×128 patch of data) in an image corresponding to the input media data.

The neural network 610 includes hidden layers 604A through 604N (collectively "604" hereinafter). The hidden layers 604 can include n number of hidden layers, where n is an integer greater than or equal to one. The number of hidden layers can include as many layers as needed for a desired processing outcome and/or rendering intent. The neural network 610 further includes an output layer 606 that provides an output (e.g., paths that are outputted to a trained planning algorithm) resulting from the processing performed by the hidden layers 604. In one illustrative example, the output layer 606 can provide paths that are most likely to occur and a path that is considered an object collision path.

The neural network 610 in this example is a multi-layer neural network of interconnected nodes. Each node can represent a piece of information. Information associated with the nodes is shared among the different layers and each layer retains information as information is processed. In some cases, the neural network 610 can include a feed-forward neural network, in which case there are no feedback connections where outputs of the neural network are fed back into itself. In other cases, the neural network 610 can include a recurrent neural network, which can have loops that allow information to be carried across nodes while reading in input.

Information can be exchanged between nodes through node-to-node interconnections between the various layers. Nodes of the input layer 602 can activate a set of nodes in the first hidden layer 604A. For example, as shown, each of the input nodes of the input layer 602 is connected to each of the nodes of the first hidden layer 604A. The nodes of the hidden layer 604A can transform the information of each input node by applying activation functions to the information. The information derived from the transformation can then be passed to and can activate the nodes of the next hidden layer (e.g., 604B), which can perform their own designated functions. Example functions include convolutional, up-sampling, data transformation, pooling, and/or any other suitable functions.

The output of the hidden layer (e.g., 604B) can then activate nodes of the next hidden layer (e.g., 604N), and so on. The output of the last hidden layer can activate one or more nodes of the output layer 606, at which point an output is provided. In some cases, while nodes (e.g., nodes 608A, 608B, 608C) in the neural network 610 are shown as having multiple output lines, a node has a single output and all lines shown as being output from a node represent the same output value.

In some cases, each node or interconnection between nodes can have a weight that is a set of parameters derived from training the neural network 610. For example, an interconnection between nodes can represent a piece of information learned about the interconnected nodes. The interconnection can have a numeric weight that can be tuned (e.g., based on a training dataset), allowing the neural network 610 to be adaptive to inputs and able to learn as more data is processed.

The neural network 610 can be pre-trained to process the features from the data in the input layer 602 using the different hidden layers 604 in order to provide the output through the output layer 606. In an example in which the neural network 610 is used to output a prediction that the movement is not association with the first type of impact when the first prediction score is below a threshold score, the neural network 610 can be trained using training data that includes datasets from counterfactual collisions where movement was not associated with a first type of impact and actual historical instances associated with the first type of impact. For instance, training images can be input into the neural network 610, which can be processed by the neural network 610 to generate outputs which can be used to tune one or more aspects of the neural network 610, such as weights, biases, etc.

In some cases, the neural network 610 can adjust weights of nodes using a training process called backpropagation.

Backpropagation can include a forward pass, a loss function, a backward pass, and a weight update. The forward pass, loss function, backward pass, and parameter update is performed for one training iteration. The process can be repeated for a certain number of iterations for each set of training media data until the weights of the layers are accurately tuned.

For a first training iteration for the neural network 610, the output can include values that do not give preference to any particular class due to the weights being randomly selected at initialization. For example, if the output is a vector with probabilities that the object includes different product(s) and/or different users, the probability value for each of the different product and/or user may be equal or at least very similar (e.g., for ten possible products or users, each class may have a probability value of 0.1). With the initial weights, the neural network 610 is unable to determine low level features and thus cannot make an accurate determination of what the classification of the object might be. A loss function can be used to analyze errors in the output. Any suitable loss function definition can be used.

The loss (or error) can be high for the first training dataset (e.g., images) since the actual values will be different than the predicted output. The goal of training is to minimize the amount of loss so that the predicted output comports with a target or ideal output. The neural network 610 can perform a backward pass by determining which inputs (weights) most contributed to the loss of the neural network 610, and can adjust the weights so that the loss decreases and is eventually minimized.

A derivative of the loss with respect to the weights can be computed to determine the weights that contributed most to the loss of the neural network 610. After the derivative is computed, a weight update can be performed by updating the weights of the filters. For example, the weights can be updated so that they change in the opposite direction of the gradient. A learning rate can be set to any suitable value, with a high learning rate including larger weight updates and a lower value indicating smaller weight updates.

The neural network 610 can include any suitable neural or deep learning network. One example includes a convolutional neural network (CNN), which includes an input layer and an output layer, with multiple hidden layers between the input and out layers. The hidden layers of a CNN include a series of convolutional, nonlinear, pooling (for downsampling), and fully connected layers. In other examples, the neural network 610 can represent any other neural or deep learning network, such as an autoencoder, a deep belief nets (DBNs), a recurrent neural networks (RNNs), etc.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Furthermore, any term of degree such as, but not limited to, "substantially," as used in the description and the appended claims, should be understood to include an exact, or a similar, but not exact configuration. Similarly, the terms "about" or "approximately," as used in the description and the appended claims, should be understood to include the recited values or a value that is three times greater or one third of the recited values. For example, about 3 mm includes all values from 1 mm to 9 mm, and approximately 50 degrees includes all values from 16.6 degrees to 150 degrees.

Lastly, the terms "or" and "and/or," as used herein, are to be interpreted as inclusive or meaning any one or any combination. Therefore, "A, B, or C" or "A, B, and/or C" mean any of the following: "A," "B," or "C"; "A and B"; "A and C"; "B and C"; "A, B and C." An exception to this definition will occur only when a combination of elements, functions, steps or acts are in some way inherently mutually exclusive.

While the present disclosure has been described with reference to various implementations, it will be understood that these implementations are illustrative and that the scope of the present disclosure is not limited to them. Many variations, modifications, additions, and improvements are possible. More generally, implementations in accordance with the present disclosure have been described in the context of particular implementations. Functionality may be separated or combined differently in various implementations of the disclosure or described with different terminology. These and other variations, modifications, additions, and improvements may fall within the scope of the disclosure as defined in the claims that follow.

What is claimed is:

1. A system comprising:
one or more processors;
a display with a user interface; and
a memory unit storing computer-executable instructions, which when executed by the one or more processors, cause the system to:
store kinematic variables associated with movement of a mobile device that occurred around a time of an event;
extract a plurality of subsets of the kinematic variables associated respectively with a plurality of time windows that span one or more amounts of time around the time of the event, wherein each time window is associated with a different type of event of a plurality of types of events and a different collision prediction algorithm of a plurality of prediction algorithms, wherein a first subset of the plurality of types of events is associated with a collision, and wherein a second subset of the plurality of types of events is not associated with a collision;

process, by each of the plurality of collision prediction algorithms a corresponding subset of the kinematic variables, wherein each of the plurality of collision prediction algorithms outputs a prediction score indicative of a likelihood that the movement is associated with a corresponding type of event; and determine, based on an aggregate of respective prediction scores, whether the movement is associated with a collision.

2. The system of claim 1, wherein the kinematic variables include at least one of global positioning system (GPS) speed variables, GPS altitude variables, and accelerometer magnitude variables.

3. The system of claim 2, wherein the kinematic variables are convolutional neural network (CNN) variables and the plurality of collision prediction algorithms comprise CNNs.

4. The system of claim 3, wherein the system is further caused to:

convert the kinematic variables into features that represent GPS speed and altitude properties and accelerometer magnitude properties associated with the movement of the mobile device, wherein the respective prediction scores are determined based on the features, and wherein the plurality of collision prediction algorithms are trained to learn which features contribute most to predicting whether the movement is associated with a corresponding type of event.

5. The system of claim 2, wherein the global positioning system (GPS) speed variables and the GPS altitude variables are associated with a particular GPS sensor window of seconds relative to the time of the event and the accelerometer magnitude variables are associated with a particular accelerometer sensor window of seconds relative to the time of event, wherein the particular GPS sensor window and the particular accelerometer sensor window are associated with a type of event that corresponds to the window of seconds.

6. The system of claim 1, wherein one or more of the plurality of types of events comprises: an amusement park ride impact, a skiing-based impact, a boat-or water-based impact, or an action sports type impact, and one or more of the plurality of collision prediction algorithms is trained with true automobile collisions.

7. The system of claim 1, wherein the system is further caused to:

train one or more of the plurality of collision prediction algorithms with a training dataset comprising a dataset from counterfactual collisions where movement was not associated with corresponding types of event or actual historical instances associated with corresponding types of events.

8. The system of claim 1, wherein the respective prediction scores are based on a continuous scale between two numbers, wherein the continuous scale correlates to a continuous likelihood of collision.

9. A computer-implemented method comprising:

training a first collision prediction algorithm of a plurality of prediction algorithms with a training dataset comprising a dataset from counterfactual collisions where movement was not associated with a first type of event and actual historical instances associated with the first type of event that occurred around a time of an event;

storing kinematic variables associated with the movement of a mobile device;

extracting a plurality of subset of the kinematic variables associated respectively with a plurality of time windows that span one or more amounts of time around the time of the event, wherein each time window is associated with a different type of event of a plurality of types of events and a different collision prediction algorithm of a plurality of prediction algorithms, wherein a first subset of the plurality of types of events is associated with a collision, and wherein a second subset of the plurality of types of events is not associated with a collision;

processing, by each of the plurality of collision prediction algorithms a corresponding subset of the kinematic variables, wherein each of the plurality of collision prediction algorithms outputs a prediction score indicative of a likelihood that the movement is associated with a corresponding type of event; and determining, based on an aggregate of respective prediction scores, whether the movement is associated with a collision.

10. The computer-implemented method of claim 9, wherein the kinematic variables include at least one of global positioning system (GPS) speed variables, GPS altitude variables, and accelerometer magnitude variables.

11. The computer-implemented method of claim 10, wherein the kinematic variables are convolutional neural network (CNN) variables and the plurality of collision prediction algorithms comprise CNNs.

12. The computer-implemented method of claim 11, further comprising:

converting the kinematic variables into features that represent GPS speed and altitude properties and accelerometer magnitude properties associated with the movement of the mobile device, wherein the respective prediction scores are determined based on the features, and wherein the plurality of collision prediction algorithms are trained to learn which features contribute most to predicting whether the movement is associated with a corresponding type of event.

13. The computer-implemented method of claim 10, wherein the global positioning system (GPS) speed variables and the GPS altitude variables are associated with a particular GPS sensor window of seconds relative to the time of the event and the accelerometer magnitude variables are associated with a particular accelerometer sensor window of seconds relative to the time of the event, wherein the particular GPS sensor window and the particular accelerometer sensor window are associated with a type of event that corresponds to the window of seconds.

14. The computer-implemented method of claim 9, wherein one or more of the plurality of types of events comprises: an amusement park ride impact, a skiing-based impact, a boat- or water-based impact, or an action sports type impact, and one or more of the plurality of collision prediction algorithms is trained with true automobile collisions.

15. A non-transitory computer-readable medium comprising instructions, the instructions, when executed by a computing system, cause the computing system to:

store global positioning system (GPS) speed variables, GPS altitude variables, and accelerometer magnitude variables associated with movement of a mobile device that occurred around a time of an event;

extract a plurality of subsets of the global positioning system (GPS) speed variables, the GPS altitude variables, and the accelerometer magnitude variables associated respectively with a plurality of time windows that span one or more amounts of time around the time of the event, wherein each time window is associated with a different type of event of a plurality of types of events and a different collision prediction algorithm of a plurality of prediction algorithms, wherein a first subset of the plurality of types of events is associated with a collision, and wherein a second subset of the plurality of types of events is not associated with a collision;

process, by each of the plurality of collision prediction algorithms a corresponding subset of the GPS speed variables, GPS altitude variables, and accelerometer magnitude variables, wherein each of the plurality of collision prediction algorithms outputs a prediction score indicative of a likelihood that the movement is associated with a corresponding type of event, wherein the first type of event is associated with the first collision prediction algorithm; and determine, based on an aggregate of respective prediction scores, whether the movement is associated with a collision.

16. The non-transitory computer-readable medium of claim 15, wherein the global positioning system (GPS) speed variables, the GPS altitude variables, and the accelerometer magnitude variables are convolutional neural network (CNN) variables and the plurality of collision prediction algorithms comprise CNNs.

* * * * *